(12) United States Patent
Fuchs et al.

(10) Patent No.: US 10,939,159 B1
(45) Date of Patent: Mar. 2, 2021

(54) SYSTEMS AND METHODS FOR ENHANCED REMOTE CONTROL

(71) Applicant: Arkade, Inc., Centennial, CO (US)

(72) Inventors: Joshua Allan Fuchs, Granada Hills, CA (US); Bob Steven Berns, Van Nuys, CA (US); Joel Abraham Kort, Van Nuys, CA (US); Michael Harold Pachter, Long Beach, CA (US)

(73) Assignee: Arkade, Inc., Centennial, CO (US)

( * ) Notice: Subject to any disclaimer, the term of this patent is extended or adjusted under 35 U.S.C. 154(b) by 0 days.

(21) Appl. No.: 17/033,447

(22) Filed: Sep. 25, 2020

Related U.S. Application Data

(60) Provisional application No. 63/059,722, filed on Jul. 31, 2020.

(51) Int. Cl.
*H04N 21/422* (2011.01)
*G08C 17/02* (2006.01)
*H04N 21/4227* (2011.01)

(52) U.S. Cl.
CPC ....... *H04N 21/42222* (2013.01); *G08C 17/02* (2013.01); *H04N 21/4227* (2013.01); *H04N 21/42221* (2013.01); *H04N 21/42225* (2013.01)

(58) Field of Classification Search
CPC ......... H04N 21/42222; H04N 21/4227; H04N 21/42221; H04N 21/42225; G08C 17/02
USPC .......................................................... 348/734
See application file for complete search history.

(56) References Cited

U.S. PATENT DOCUMENTS

| 10,427,036 | B2 | 10/2019 | Burgess et al. | |
|---|---|---|---|---|
| 2012/0169482 | A1* | 7/2012 | Chen | G08C 23/04 340/12.52 |
| 2016/0011660 | A1* | 1/2016 | Wieder | G06F 3/0383 345/158 |
| 2017/0189803 | A1* | 7/2017 | Atwell | A63F 13/21 |
| 2020/0093946 | A1* | 3/2020 | Nguyen | H02J 7/0042 |
| 2020/0280756 | A1* | 9/2020 | Vurimi | H04N 21/4532 |

* cited by examiner

*Primary Examiner* — Michael Lee
(74) *Attorney, Agent, or Firm* — Foley & Lardner LLP

(57) ABSTRACT

In some aspects, the disclosure is directed to methods and systems for enhanced remote control of diverse appliances or devices with support for "legacy" devices as well as providing enhanced functionality. In some implementations, the remote control may utilize a multi-device communications scheme and partner with a computing device, such as a smartphone or other such device, to provide added functionality, including network functionality.

20 Claims, 8 Drawing Sheets

SYSTEMS AND METHODS FOR ENHANCED REMOTE CONTROL

RELATED APPLICATIONS

This application claims the benefit of and priority to U.S. Provisional Patent Application No. 63/059,722, entitled "Systems and Methods for Enhanced Remote Control," filed Jul. 31, 2020, the entirety of which is incorporated by reference herein.

FIELD OF THE DISCLOSURE

This disclosure generally relates to systems and methods for communications. In particular, this disclosure relates to systems and methods for enhanced remote control of devices.

BACKGROUND OF THE DISCLOSURE

Television remote controls were invented soon after the invention of televisions themselves, and are considered a crucial part of any entertainment system. However, many implementations of remote controls are difficult to use or limited in functionality, only providing channel or volume selection with a numeric keypad or directional buttons. Additionally, many remote controls are device-specific, resulting in many users having piles of different controls for televisions, set top boxes, amplifiers, etc. "Universal" or programmable remote controls provide potential replacements for these device-specific remote controls, but still suffer from limited functionality as above.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for enhanced remote control; and Section B describes a network environment and computing environment which may be useful for practicing embodiments described herein.

A. Systems and Methods for Enhanced Remote Control

Many implementations of remote controls are difficult to use or limited in functionality, only providing channel or volume selection with a numeric keypad or directional buttons. Additionally, many remote controls are device-specific, resulting in many users having piles of different controls for televisions, set top boxes, amplifiers, etc. "Universal" or programmable remote controls provide potential replacements for these device-specific remote controls, but still suffer from limited functionality as above.

In one aspect, the present disclosure provides systems and methods for enhanced remote control of diverse appliances or devices with support for "legacy" devices as well as providing enhanced functionality. In some implementations, the remote control may utilize a multi-device communications scheme and partner with a computing device, such as a smartphone or other such device, to provide added functionality, including network functionality.

Figure 1:
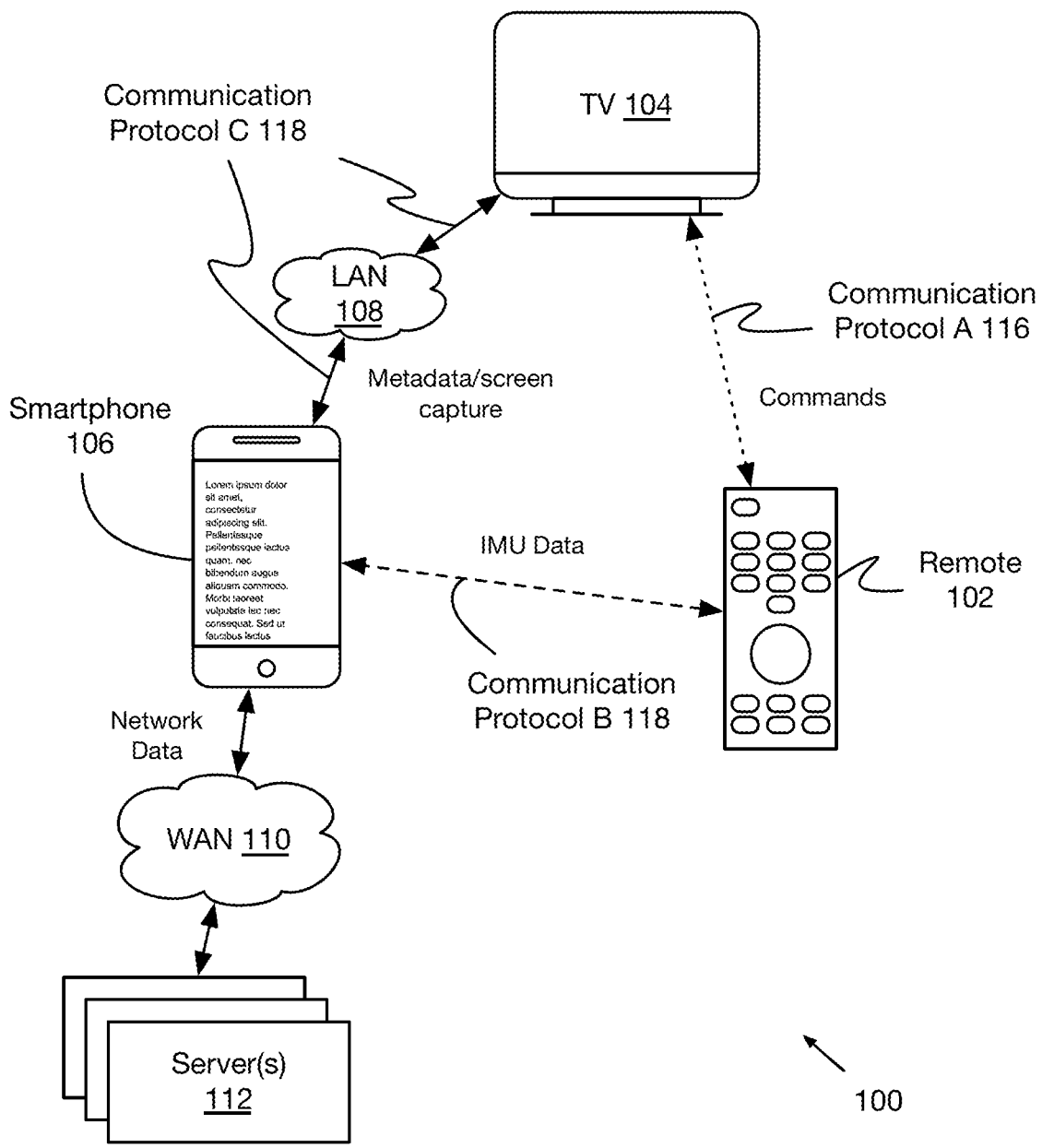
FIG. 1 is a block diagram depicting an embodiment of a remote control network architecture.

For example, referring first to FIG. 1, illustrated is s a block diagram depicting an embodiment of a remote control network architecture 100. A remote control 102 may comprise multiple input devices, including buttons, a capacitive or resistive touch pad or touch screen, a microphone, and/or an inertial measurement unit (IMU), comprising accelerometers, gyroscopes, magnetometers, or other such measurement devices or sensors. The remote control may comprise multiple output devices or wireless transceivers for communication with other devices, and may include a first transceiver for communicating via a first communication protocol A 116 with a television 104 or other such appliance (e.g. set top box, cable box, amplifier, etc.). The first communication protocol A 116 may comprise, in various implementations, infrared, Bluetooth, or other such short range wireless signals. The remote control may also include a second transceiver (which maybe the same transceiver as the first transceiver in some implementations) for communicating via a second communication protocol B 118 with a smartphone 106 or other computing device (e.g. laptop computing device, desktop computing device, tablet computing device, smart appliance or Internet-of-Things (IoT) device, home automation device, etc.). The second communication protocol may comprise, in various implementations, Bluetooth or 802.11 wireless (WiFi) communications. The smartphone 106 or other such device may similarly include an additional transceiver (or the same transceiver, in some implementations) for communicating via a communication protocol C 118 with the television 104 or other appliances, typically via a local area network (LAN) 108. For example, LAN 108 may be provided via a router or access point, and television 104 and smartphone 106 may communicate with each other via the LAN via WiFi. The smartphone 106 may also communicate (via the LAN 108 in some implementations) with one or more servers, including social media servers or networks, social chat servers, online databases for information about shows, retail web applications, etc.

This architecture can enable advanced identification of entities or features within television programs without requiring manual tagging or identification in metadata of the programs. For example, remote control 102 may communicate with a smart television or set-top box 104 via infrared signaling 116 to provide channel/volume commands or other controls, and may also communicate with a smartphone 106 via Bluetooth 118, providing IMU data indicating what the remote control is pointing at (e.g. orientation data in three axes). The smartphone 106 also communicates with the television or set-top box via WiFi 118, as well as external data servers 112. Triggered by a press of a hardware button on the remote control or selection via a touchpad or microphone or other interface, the remote control 102 can transmit a signal to the television or set top box 104 to capture a screenshot of the current program, and the television or set top box can provide the screenshot and metadata to the smartphone 106 via WiFi 118, including an identification of the show title, timestamp, etc. Using the IMU data from the remote control 102, the smartphone 106 (or a remote server 112 under direction of the smartphone 106) can determine an entity within the screenshot that the remote 102 is pointing at (e.g. by determining a subregion of the screen based on the IMU data, and then performing object or face detection within that subregion, or based on other metadata identifying objects within the scene), and may retrieve information about the entity for display on the smartphone 106 and/or the television 104. Such additional information may include information about actors from an online database, information about products visible in the screenshot from an online retailer including an opportunity to order or purchase the products, etc. Accordingly, the system allows image recognition and object identification of entities within television programs or movies that are selected using the remote control's IMU, with the user's smartphone or other computing device serving as a system controller and, in many implementations, a secondary feature display.

Figure 2A:
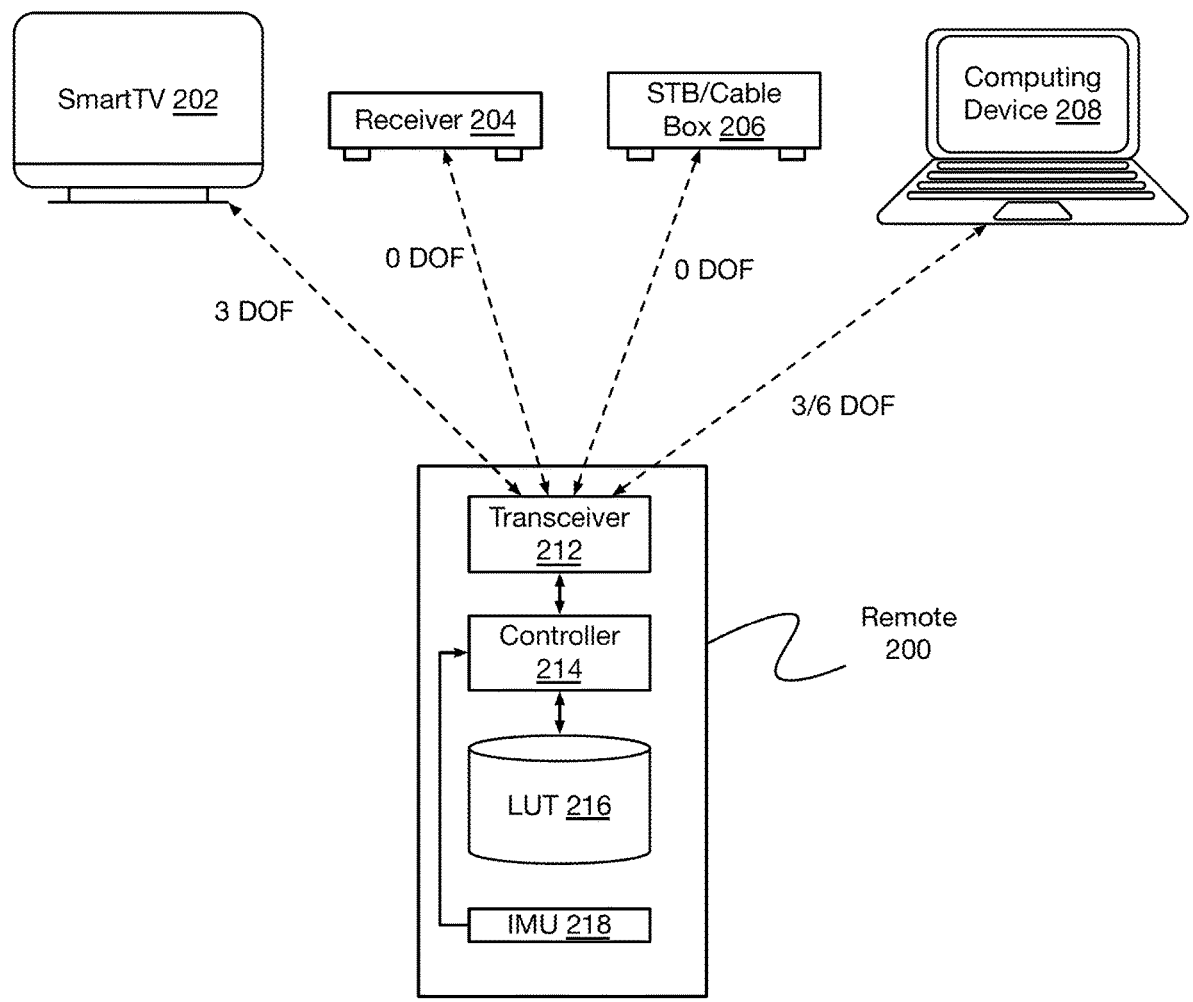
FIG. 2A is a block diagram of an embodiment of a multi-device enhanced remote control.
Figure 2B:
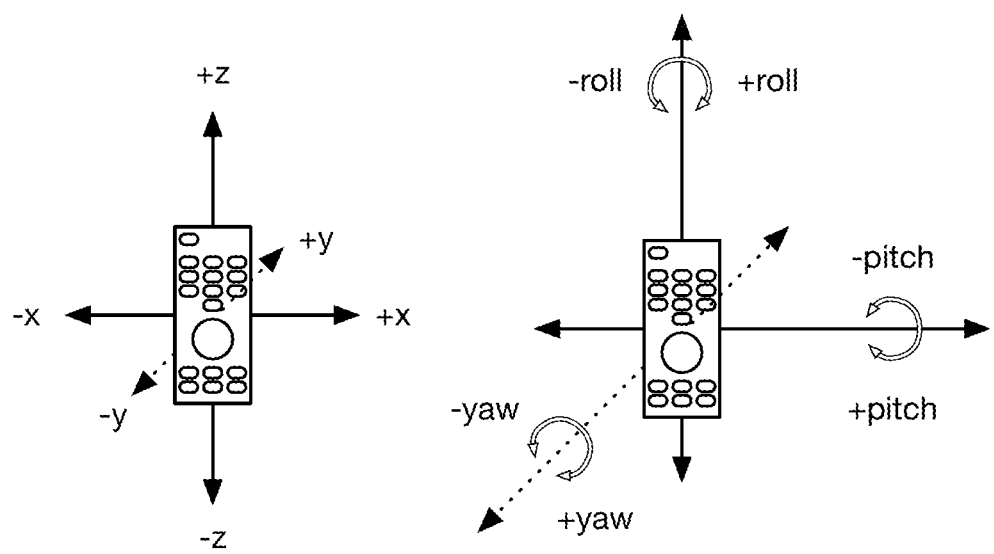
FIG. 2B is an illustration of six degrees-of-freedom (DOF) of a remote control, according to some embodiments.

As discussed above, in some implementations, a remote control may be used to control multiple devices, including devices with different functionality, in a more intuitive and user friendly manner. FIG. 2A is a block diagram of an embodiment of a multi-device enhanced remote control 200. The remote control may include an IMU 218, and a dynamic device recognition system or controller 214. Via a transceiver 212, the remote 200 can connect via Bluetooth or any other suitable protocol to an appliance (e.g. smart television 202, set top box 206, audio system 204, computing device 208, etc.) and identify the device based on the connection. The remote control 200 may include a database or look up table 216 of device capabilities. If the appliance can handle free pointing (e.g. with 3 rotational degrees of freedom, or up to six degrees of freedom such as 3 rotational degrees of freedom and 3 translational degrees of freedom), then the MU output may be provided in a raw format (e.g. as a string or vector of sensor data from the IMU) to the appliance, with full analog up/down/left/right control over a pointer on a user interface of the appliance. FIG. 2B is an illustration of six degrees-of-freedom (DOF) of a remote control, according to some embodiments, showing three translational degrees of freedom at left (e.g. forward or back in the z direction, left or right in the x direction, and up or down in the y direction, though these axes may be otherwise labeled); and three rotational degrees of freedom at right (e.g. positive and negative roll, pitch, and yaw).

For example, the IMU pitch and yaw outputs may be provided to a smart television with an on-screen cursor, or a computing device to control a mouse cursor. If the appliance cannot handle free pointing but instead has a menu system or even a simple channel or volume indicator that responds to up/down commands, then the remote 200 may send button press-style commands (e.g. corresponding IR codes or Bluetooth commands) to the appliance based on the IMU position or orientation. This may allow use of the rotational or translational degrees of freedom and IMU sensors for digital button press commands.

Figure 2C:
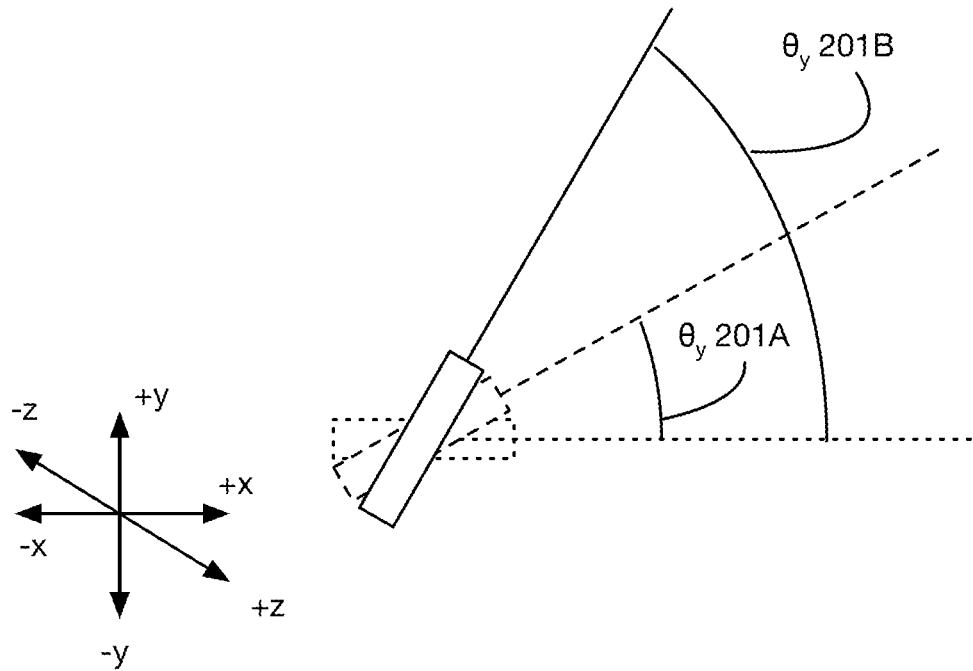
FIG. 2C is an illustration of mapping of translation or rotational data to controls, according to some embodiments.

FIG. 2C is an illustration of mapping of analog translation or rotational data to digital controls, according to some embodiments. A pitch angle $\theta_y$ of the IMU sensor may be compared to one or more thresholds, and upon exceeding a threshold or falling within a range between two thresholds, a command may be transmitted by the transceiver of the remote control. For example, given a first threshold $\theta_y$ 201A of 25 degrees and a second threshold $\theta_y$ 201B of 50 degrees, if a user tilts the remote control upwards between this range, the controller may trigger the remote control to transmit an "up" command once, as if pressing a physical button on a remote (e.g. sending a corresponding IR code or command via Bluetooth). In some implementations, tilting the remote control to a greater range (e.g. above $\theta_y$ 201B but less than 90 degrees) may trigger the controller to transmit repeated "up" commands, as if pressing a button multiple times on a standard remote. This may allow for use and intuitive control (e.g. flick the remote upwards once to change a channel once or select a next menu item, tilt the remote upwards and keep it there to continuously scroll up through a menu or repeatedly change channels). Rotational sensors and thresholds may be mapped to any appliance command, including changing volume (e.g. rolling the remote counterclockwise to reduce volume and clockwise to increase volume, in a similar manner to that discussed above), scrolling horizontally through menus responsive to a yaw sensor and thresholds, selecting alternate modes, etc. Translational degrees of freedom may be similarly mapped, with acceleration in a given direction above a threshold triggering the controller to transmit a mapped command (e.g. thrust the remote control forward to power on or off an appliance, shake the remote control side to side to trigger a mute function, etc.). The remote may also be used for controlling viewing direction in a 360 degree video (e.g. rotate remote to rotate view), or for switching between camera feeds (e.g. rotate one way for camera one, other way for camera two, etc.), in some implementations.

Figure 2D:
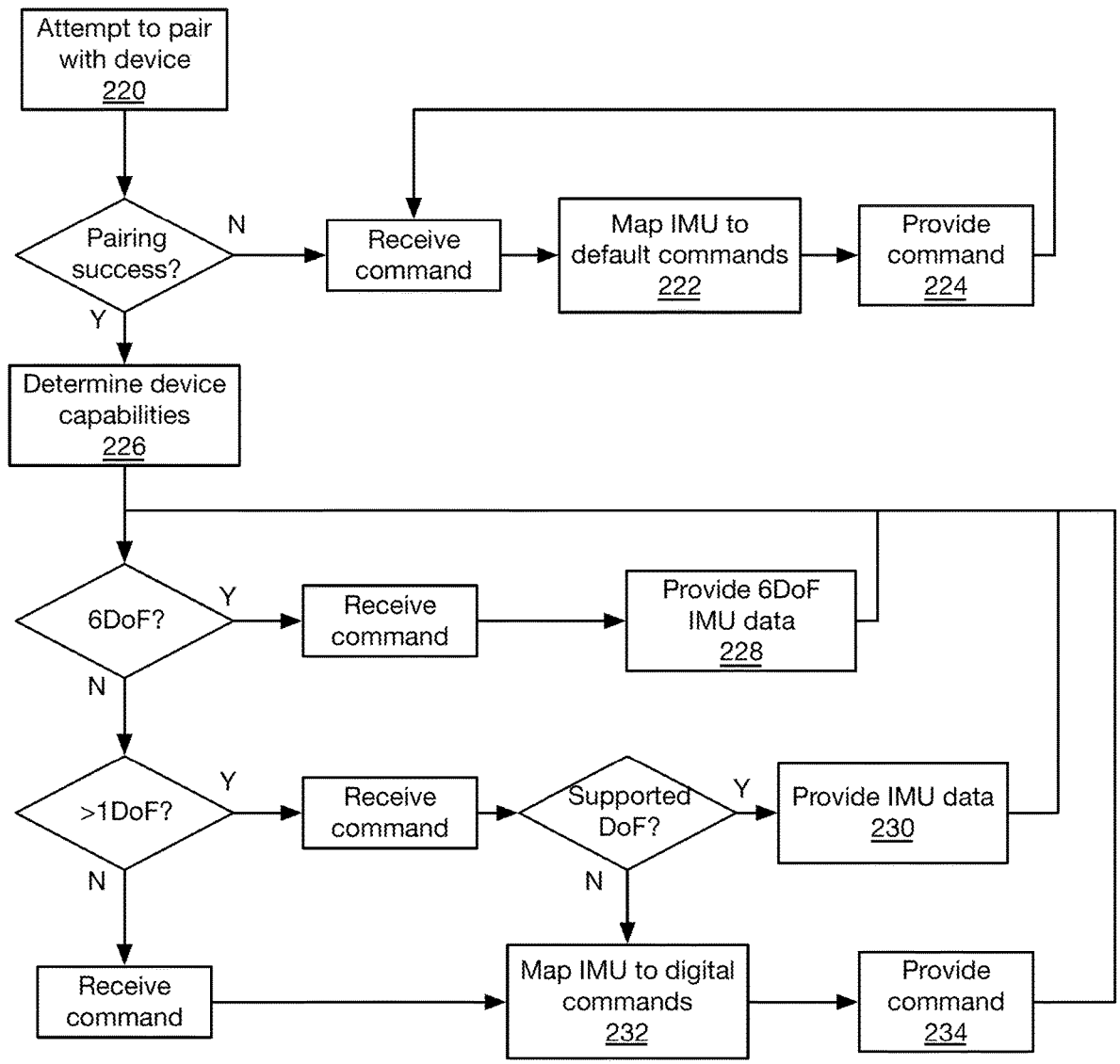
FIG. 2D is a flow chart of an embodiment of a method for multi-device enhanced remote control.

FIG. 2D is a flow chart of an embodiment of a method for multi-device enhanced remote control. At step 220, the remote control may attempt to pair with an appliance. If the pairing is unsuccessful (e.g. because the appliance does not utilize Bluetooth for pairing with remote controls, or because the appliance only has an IR receiver and no capability of communicating with the remote control), the remote control may default to a legacy or 0 degree of freedom mode in which rotational and/or translational sensors are mapped to a set of default commands as discussed above (e.g. pitch up for channel up or menu up, pitch down for channel down or menu down, etc.) with corresponding IR codes being transmitted responsive to a sensor value exceeding a threshold or lying within a matching set of thresholds.

If the remote can successfully pair with the appliance or device, the controller may determine device capabilities at step 226. Determining the device capabilities may comprise receiving an identifier from the appliance or device (e.g. a GUID, a MAC address, a manufacturer string, etc.) which may be included in a Bluetooth header or payload during handshaking or pairing of communications, and looking up corresponding device capabilities in a lookup table of the remote control.

If the device is capable of 6 degrees of freedom, then at step 228, raw (or scaled in some implementations) IMU data may be provided to the device. If the device is capable of accepting at least one analog degree of freedom (e.g. devices that allow pointing-based control, utilize scroll wheels, etc.), then upon determining that the sensor data indicates a command (e.g. by exceeding a threshold), the controller may determine whether the command corresponds to one of the accepted analog degrees of freedom. If so, at step 230, the remote control may provide the raw or scaled sensor data for the corresponding degree or degrees (e.g. pitch and yaw orientation data, etc.). If not, then at step 232, the IMU sensor data may be mapped to digital commands and at step 234 provided to the device, as discussed above (e.g. sending one or more command strings responsive to the sensor data exceeding a threshold or falling within a corresponding set of thresholds). Similarly, if the device pairs with the remote control, but cannot accept any analog degrees of freedom control, then at step 232, any detected commands from the IMU sensors may be mapped to digital commands and provided to the device at step 234.

Figure 3:
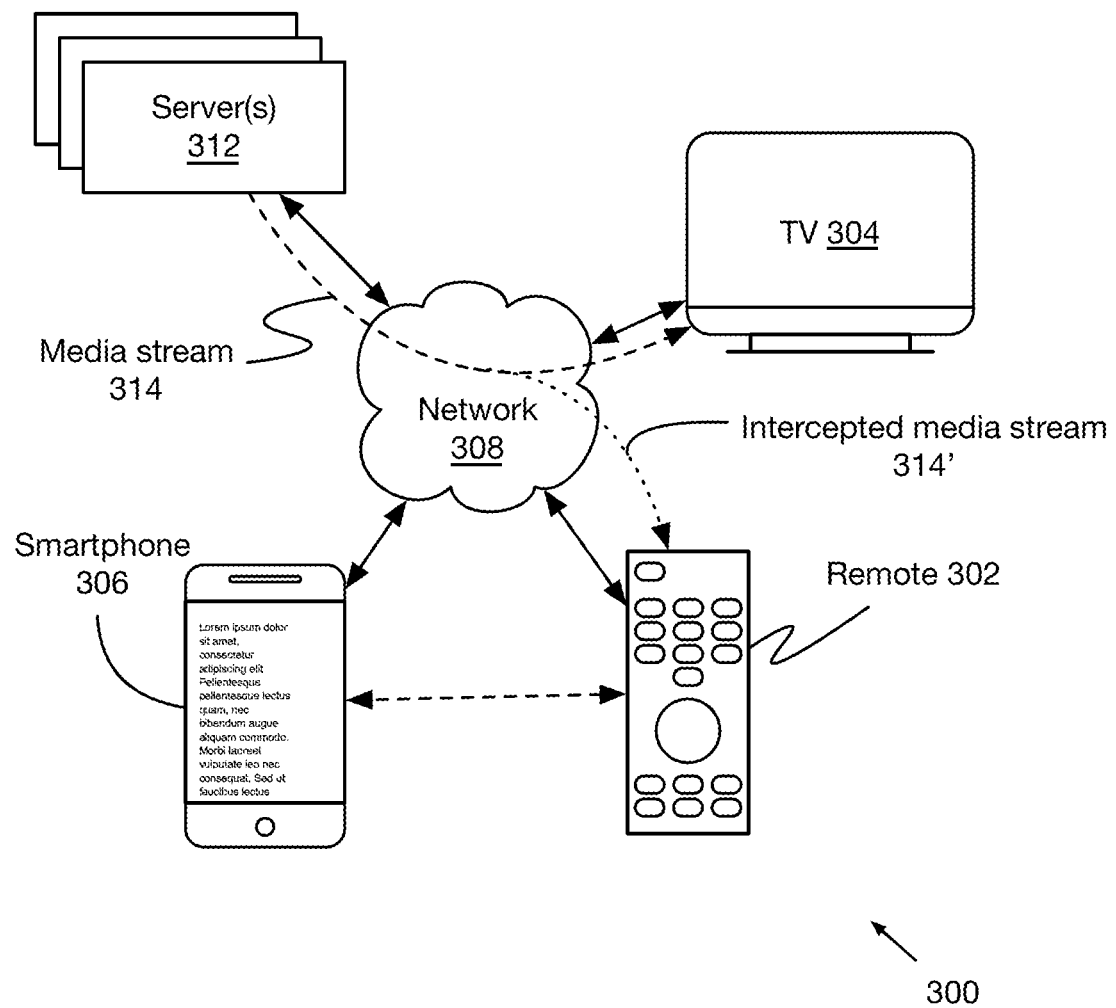
FIG. 3 is a block diagram of an embodiment of remote control-based stream monitoring.

As discussed above in connection with FIG. 1, in some implementations, the systems and methods discussed herein may be used to gather additional data about television programs or other media, by retrieving metadata or screenshots from the television or appliance or causing this metadata or screenshots to be provided to another computing device for processing and/or object or entity recognition. However, in some instances, appliances may not provide an API for accessing metadata or controlling screen captures or other such functionality. Accordingly, in some implementations, a remote control may provide stream monitoring functionality. FIG. 3 is a block diagram of an embodiment of a system 300 for remote-control based stream monitoring. In some implementations, a WiFi connected remote 302 may include a packet sniffer (sometimes referred to as a packet monitor or interceptor) and, in some implementations, a video decoder. The packet sniffer may monitor the network 308 for packets of a media stream 314 directed to the smart television or set top box 304 from a media server 312, such as packets broadcast by a WiFi access point. The packet sniffer may partially or completely decode or analyze these intercepted packets 314', such as decoding or parsing header information metadata and timestamps at an application, presentation, or session layer of the packets. The metadata and/or timestamps may identify a program stream and point within the program stream, and the remote control (or another computing device at the direction of the remote control and provided with the intercepted metadata or timestamps) may identify a currently streaming program. In some implementations in which a program stream is encrypted, the remote control may monitor the media stream flow for flow characteristics, such as packet sizes, burstiness, unencrypted transport layer information, etc. In some implementations, these monitored characteristics may be provided to a neural network executed by the remote control (e.g. via a tensor processing unit or other co-processor of the remote control) or executed by another device such as a smartphone 306 or server 312, which may be trained on similar intercepted media streams that have been manually tagged with metadata or otherwise identified. With characteristics of the stream flow recorded over a long enough period (e.g. several minutes, in many cases), the neural network may be able to properly classify the stream flow as corresponding to a known stream flow, despite the use of encryption.

Accordingly, the methods and systems discussed herein provide for enhanced remote control of diverse appliances or devices with support for "legacy" devices as well as providing enhanced functionality. In some implementations, the remote control may utilize a multi-device communications scheme and partner with a computing device, such as a smartphone or other such device, to provide added functionality, including network functionality.

In a first aspect, the present disclosure is directed to a multi-communication protocol remote control. The remote control comprises a user interface; an inertial measurement unit; a first wireless communication interface, configured for sending commands selected via the user interface to a media appliance via a first wireless communication protocol; and a second wireless communication interface, configured for sending data output from the inertial measurement unit to a portable computing device via a second wireless communication protocol. The portable computing device is in communication with the media appliance via a third wireless communication protocol.

In some implementations, the first wireless communication interface comprises an infrared transmitter. In some implementations, the first wireless communication interface comprises a Bluetooth transmitter. In some implementations, the second wireless communication interface comprises a Bluetooth transmitter. In some implementations, the first wireless communication interface is configured to send a trigger command to the appliance via the first wireless communication protocol, receipt of the trigger command causing the appliance to transmit media metadata and a screen capture of a media stream to the portable computing device via the third wireless communication protocol.

In another aspect, the present disclosure is directed to a method for multi-communication protocol remote control. The method includes sending commands selected via a user interface to a media appliance via a first wireless communication protocol using a first wireless communication interface; and sending data output from an inertial measurement unit to a portable computing device via a second wireless communication protocol using a second wireless communication interface. The portable computing device is in communication with the media appliance via a third wireless communication protocol.

In some implementations, the first wireless communication interface comprises an infrared transmitter. In some implementations, the first wireless communication interface comprises a Bluetooth transmitter. In some implementations, the second wireless communication interface comprises a Bluetooth transmitter. In some implementations, the method includes sending, via the first wireless communication interface, a trigger command to the appliance via the first wireless communication protocol, receipt of the trigger command causing the appliance to transmit media metadata and a screen capture of a media stream to the portable computing device via the third wireless communication protocol.

In another aspect, the present disclosure is directed to a system, comprising a computing device comprising a processor, a first wireless interface and a second wireless interface. The processor is configured to: receive, via the first wireless interface from a remote control device, inertial measurement unit (IMU) data; receive, via the second first wireless interface from a media appliance, media metadata and a screen capture of a media stream, the media metadata and screen capture of the media stream transmitted by the media appliance responsive to receipt of a command from the remote control device via a third wireless interface; identify, via the IMU data and screen capture, a selected entity within the screen capture; transmit, to a remote server, an identification of the selected entity and the media metadata; and receive, from the remote server, additional data about the selected entity, the remote server retrieving the additional data based on a search of the identification of the selected entity and the media metadata.

In some implementations, the processor is further configured to identify a subregion of the screen capture comprising the selected entity based on the IMU data; and the remote server retrieves the additional data based on a reverse image lookup of the identified subregion of the screen capture and the media metadata. In some implementations, the processor is further configured to detect a face in the screen capture; and wherein the remote server retrieves the additional data based on a reverse image lookup of the detected face and the media metadata.

In another aspect, the present disclosure is directed to a method, comprising: receiving, by a computing device via a first wireless interface from a remote control device, inertial measurement unit (IMU) data; receiving, by the computing device via a second first wireless interface from a media appliance, media metadata and a screen capture of a media stream, the media metadata and screen capture of the media stream transmitted by the media appliance responsive to receipt of a command from the remote control device via a third wireless interface; identifying, via the IMU data and screen capture, a selected entity within the screen capture; transmitting, to a remote server, an identification of the selected entity and the media metadata; and receiving, from the remote server, additional data about the selected entity, the remote server retrieving the additional data based on a search of the identification of the selected entity and the media metadata.

In some implementations, the method includes identifying a subregion of the screen capture comprising the selected entity based on the IMU data; and the remote server retrieves the additional data based on a reverse image lookup of the identified subregion of the screen capture and the media metadata. In some implementations, the method includes detecting a face in the screen capture; and wherein the remote server retrieves the additional data based on a reverse image lookup of the detected face and the media metadata.

In another aspect, the present disclosure is directed to a self-reconfigurable remote control. The remote control includes an inertial measurement unit (IMU); a transceiver in communication with a device; a memory storing a device capability lookup table (LUT); and a processor, configured to: identify the device type according to a pairing sequence; determine, via the LUT, an IMU degree-of-freedom capability of the device; measure a deflection of the IMU from a first orientation; map the measured deflection of the IMU to a data sequence according to the determined IMU degree-of-freedom capability of the device; and transmit, via the transceiver, the data sequence to the device.

In some implementations, the pairing sequence is unsuccessful, and the processor is further configured to map the measured deflection to a digital command sequence. In a further implementation, the transceiver comprises an infrared transceiver, and the processor is further configured to transmit the digital command sequence via the infrared transceiver to the device.

In some implementations, the processor is configured to: determine the device has capability for between one and six degrees-of-freedom for command sequences; determine that the measured deflection is in an unsupported degree-of-freedom; and map the measured deflection to a digital command sequence. In some implementations, the processor is configured to: determine the device has capability for between one and six degrees-of-freedom for command sequences, and determine that the measured deflection is in a supported degree-of-freedom; and mapping the measured deflection of the IMU to the data sequence comprises generating the data sequence comprising the IMU data output.

In some implementations, the processor is further configured to: compare the measured deflection of the IMU to a first threshold; and map the measured deflection of the IMU to the data sequence responsive to the measured deflection exceeding the first threshold. In a further implementation, the processor is further configured to map the measured deflection of the IMU to the data sequence responsive to the measured deflection exceeding the first threshold but not exceeding a second threshold.

In some implementations, the processor is configured to determine the device has capability for six degrees-of-freedom for command sequences; and mapping the measured deflection of the IMU to the data sequence comprises generating the data sequence comprising the IMU data output.

In some implementations, the pairing sequence comprises receiving a device identifier from the device.

In another aspect, the present disclosure is directed to method for self-reconfigurable remote control. The method includes identifying, by a remote control in communication via a transceiver with a media device, a device type of the media device according to a pairing sequence; determining, via a device type lookup table (LUT), an inertial measurement unit (IMU) degree-of-freedom capability of the media device; measuring a deflection of an IMU of the remote control from a first orientation; mapping the measured deflection of the IMU to a data sequence according to the determined IMU degree-of-freedom capability of the media device; and transmitting, via the transceiver, the data sequence to the media device.

In some implementations, the pairing sequence is unsuccessful, and the method includes mapping the measured deflection to a digital command sequence. In a further implementation, the transceiver comprises an infrared transceiver, and the method includes transmitting the digital command sequence via the infrared transceiver to the media device.

In some implementations, the method includes: determining the media device has capability for between one and six degrees-of-freedom for command sequences; determining that the measured deflection is in an unsupported degree-of-freedom; and mapping the measured deflection to a digital command sequence. In some implementations, the method includes determining the media device has capability for between one and six degrees-of-freedom for command sequences, and determining that the measured deflection is in a supported degree-of-freedom; and mapping the measured deflection of the IMU to the data sequence comprises generating the data sequence comprising the IMU data output.

In some implementations, the method includes comparing the measured deflection of the IMU to a first threshold; and mapping the measured deflection of the IMU to the data sequence responsive to the measured deflection exceeding the first threshold. In a further implementation, the method includes mapping the measured deflection of the MU to the data sequence responsive to the measured deflection exceeding the first threshold but not exceeding a second threshold.

In some implementations, the method includes determining the media device has capability for six degrees-of-freedom for command sequences; and mapping the measured deflection of the IMU to the data sequence comprises generating the data sequence comprising the IMU data output.

In some implementations, the pairing sequence comprises receiving a device identifier from the media device.

In another aspect, the present disclosure is directed to an enhanced data-providing remote control, comprising: a first wireless interface configured to intercept a media stream provided to a media appliance; a decoder configured to at least partially decode the intercepted media stream to extract metadata of the media stream; and a second wireless interface configured to transmit the extracted metadata to a portable computing device, the portable computing device displaying an identification of the media stream based on the extracted metadata.

In some implementations, the first wireless interface is configured to intercept a broadcast of the media stream from a wireless access point to the media appliance. In some implementations, the decoder is configured to extract header metadata of the intercepted media stream without decoding payload data of the intercepted media stream.

In another aspect, the present disclosure is directed to method for enhanced data-providing remote control, comprising: intercepting, by a first wireless interface of a remote control, a media stream provided to a media appliance; at least partially decoding, by the remote control, the intercepted media stream to extract metadata of the media stream; and transmitting, via a second wireless interface of the remote control, the extracted metadata to a portable computing device, the portable computing device displaying an identification of the media stream based on the extracted metadata.

In some implementations, the method includes intercepting, via the first wireless interface, a broadcast of the media stream from a wireless access point to the media appliance. In some implementations, the method includes extracting header metadata of the intercepted media stream without decoding payload data of the intercepted media stream.

B. Computing and Network Environment

Figure 4A:
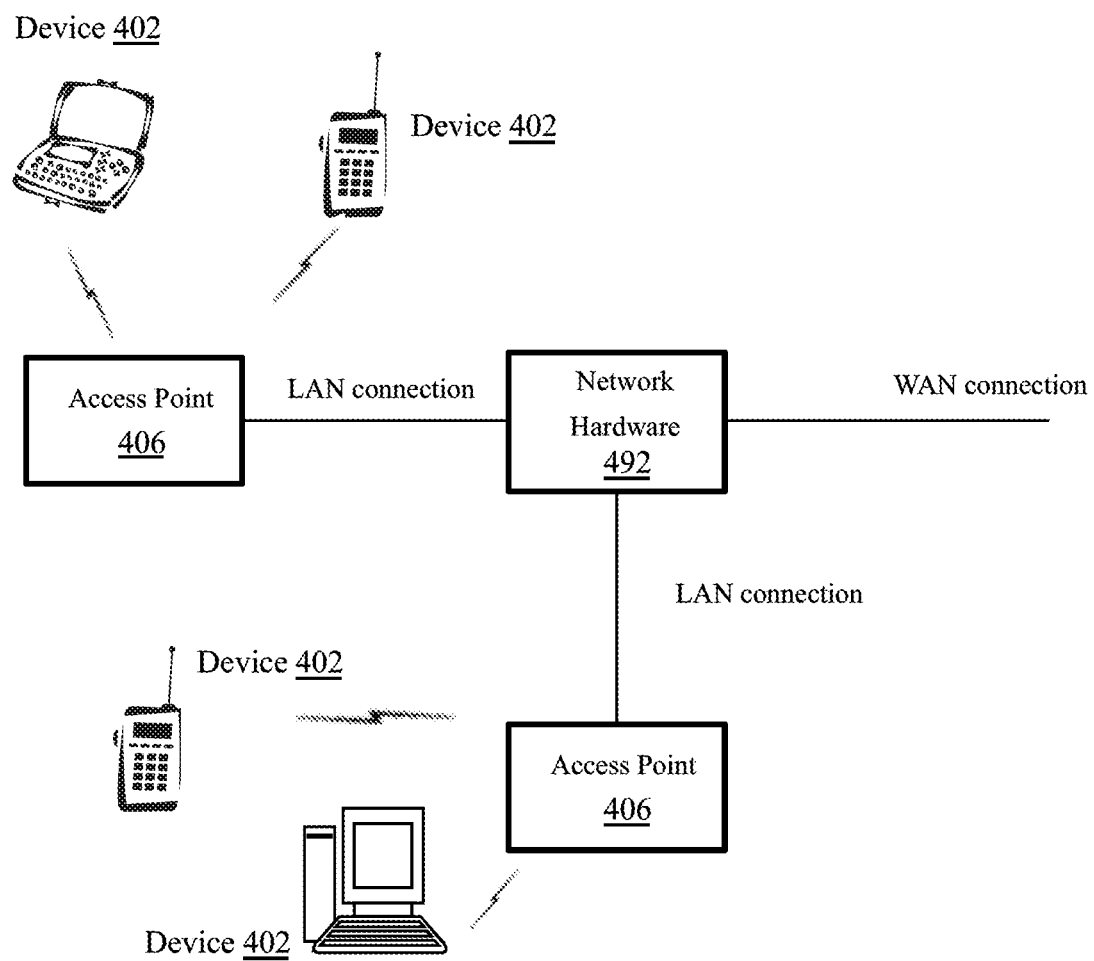
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment The access points (APs) 406 may be operably coupled to the network hardware 492 via local area network connections. The network hardware 492, which may include a router, gateway, switch, bridge, modem, system controller, appliance, etc., may provide a local area network connection for the communication system. Each of the access points 406 may have an associated antenna or an antenna array to communicate with the wireless communication devices 402 in its area. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

In some embodiments an access point 406 includes a device or module (including a combination of hardware and software) that allows wireless communication devices 402 to connect to a wired network using Wi-Fi, or other standards. An access point 406 may sometimes be referred to as an wireless access point (WAP). An access point 406 may be configured, designed and/or built for operating in a wireless local area network (WLAN). An access point 406 may connect to a router (e.g., via a wired network) as a stand-alone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection. An access point 406 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 406 may be used for (e.g., in-home or in-building) wireless networks (e.g., IEEE 802.11, Bluetooth, ZigBee, any other type of radio frequency based network protocol and/or variations thereof). Each of the wireless communication devices 402 may include a built-in radio and/or is coupled to a radio. Such wireless communication devices 402 and/or access points 406 may operate in accordance with the various aspects of the disclosure as presented herein to enhance performance, reduce costs and/or size, and/or enhance broadband applications. Each wireless communication devices 402 may have the capacity to function as a client node seeking access to resources (e.g., data, and connection to networked nodes such as servers) via one or more access points 406.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4B:
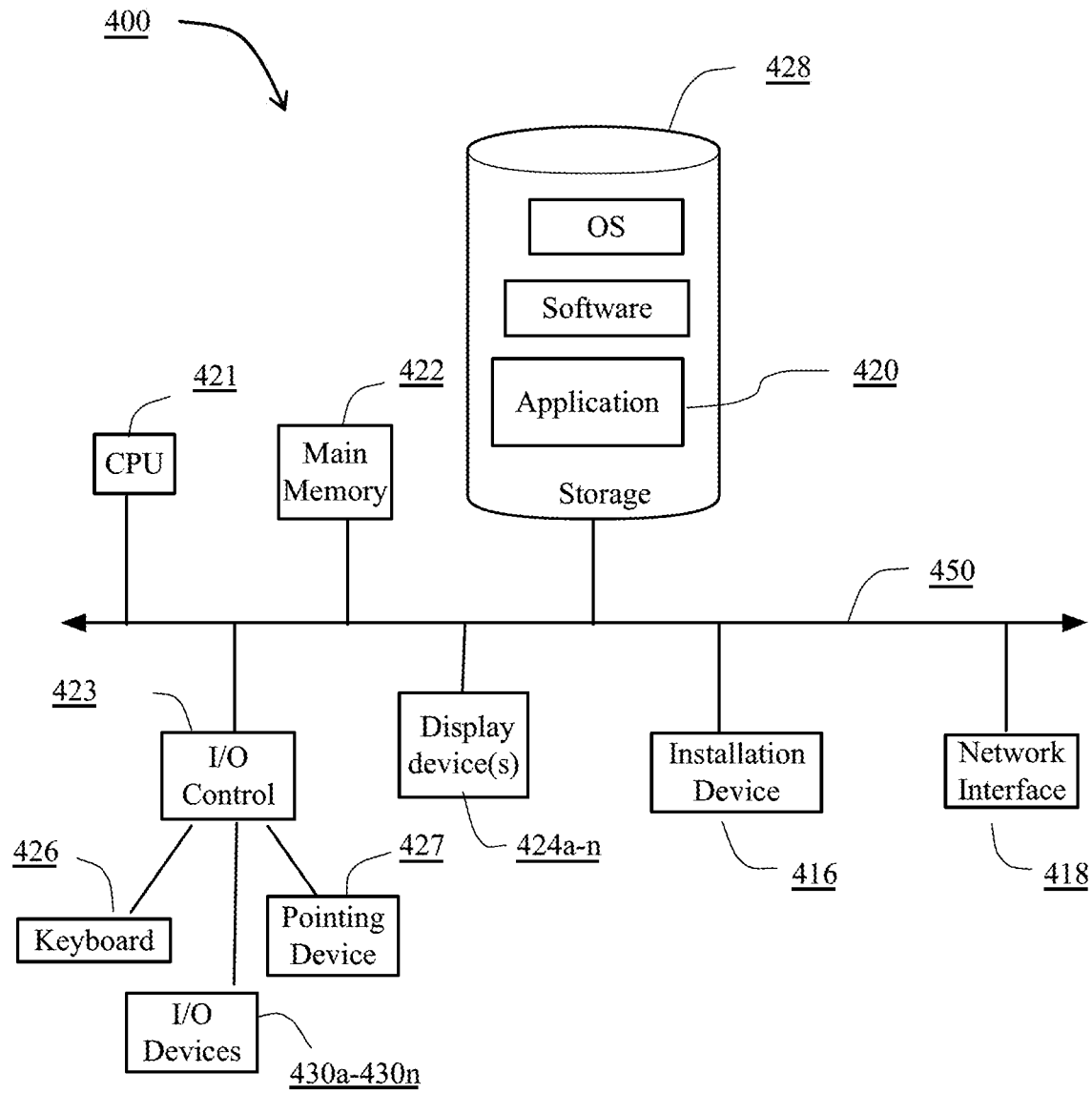
FIGS. 4B and 4C are block diagrams depicting embodiments of computing devices useful in connection with the methods and systems described herein.
Figure 4C:
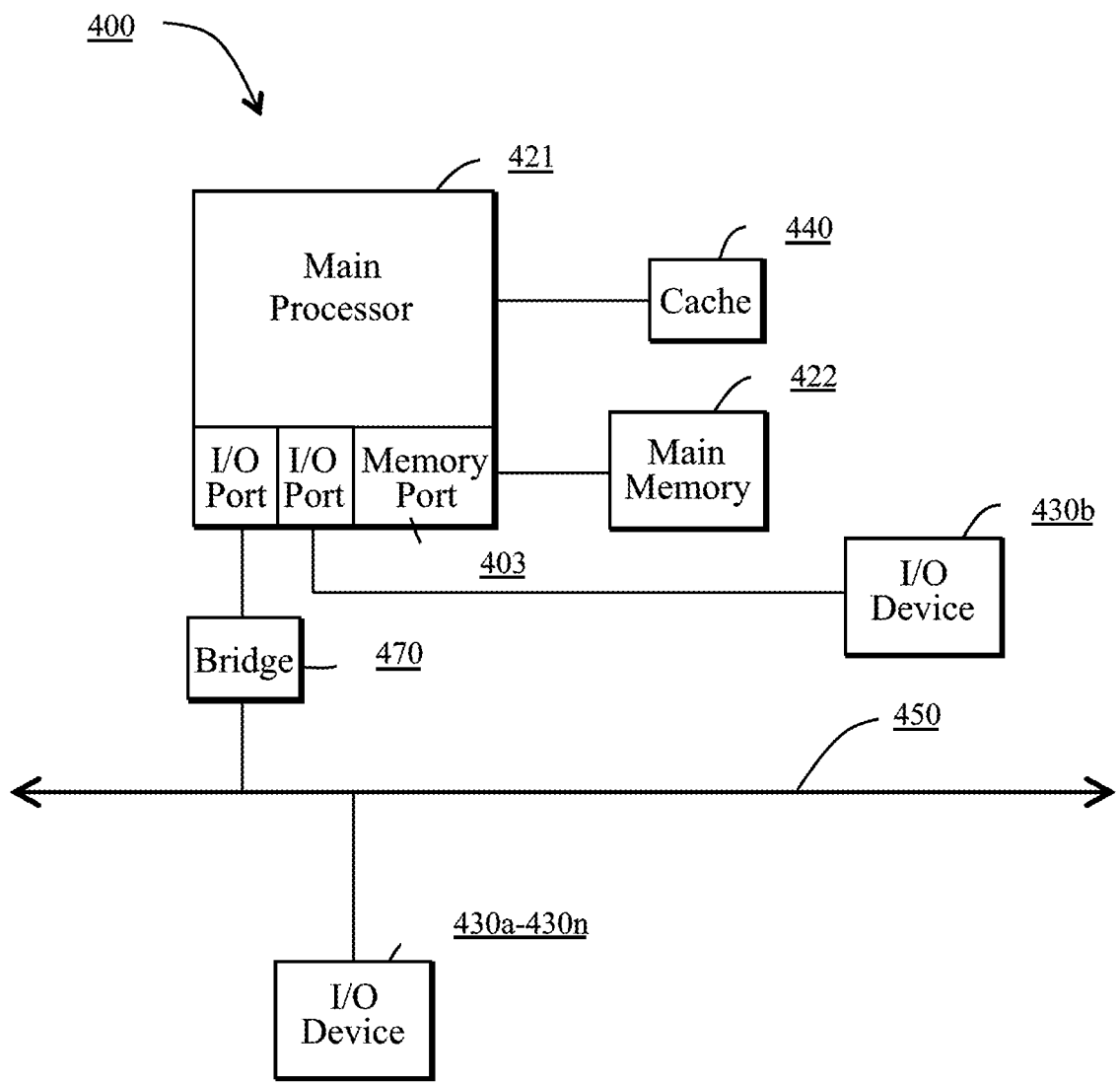

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424*a*-424*n*. In one embodiment, a video adapter may include multiple connectors to interface to the display device(s) 424*a*-424*n*. In other embodiments, the computing device 400 may include multiple video adapters, with each video adapter connected to the display device(s) 424*a*-424*n*. In some embodiments, any portion of the operating system of the computing device 400 may be configured for using multiple displays 424*a*-424*n*. One ordinarily skilled in the art will recognize and appreciate the various ways and embodiments that a computing device 400 may be configured to have one or more display devices 424*a*-424*n*.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed:

1. A self-reconfigurable remote control, comprising:
   an inertial measurement unit (IMU);
   a transceiver in communication with a device;
   a memory storing a device capability lookup table (LUT); and
   a processor, configured to:
   identify the device type according to a pairing sequence, determine, via the LUT, an IMU degree-of-freedom capability of the device, measure a deflection of the IMU from a first orientation, map the measured deflection of the IMU to a data sequence according to the determined IMU degree-of-freedom capability of the device, and transmit, via the transceiver, the data sequence to the device.

2. The self-reconfigurable remote control of claim 1, wherein the pairing sequence is unsuccessful, and wherein the processor is further configured to map the measured deflection to a digital command sequence.

3. The self-reconfigurable remote control of claim 2, wherein the transceiver comprises an infrared transceiver, and wherein the processor is further configured to transmit the digital command sequence via the infrared transceiver to the device.

4. The self-reconfigurable remote control of claim 1, wherein the processor is configured to:

determine the device has capability for between one and six degrees-of-freedom for command sequences;

determine that the measured deflection is in an unsupported degree-of-freedom; and map the measured deflection to a digital command sequence.

5. The self-reconfigurable remote control of claim 1, wherein the processor is configured to:

determine the device has capability for between one and six degrees-of-freedom for command sequences, and determine that the measured deflection is in a supported degree-of-freedom; and wherein mapping the measured deflection of the IMU to the data sequence comprises generating the data sequence comprising the IMU data output.

6. The self-reconfigurable remote control of claim 1, wherein the processor is further configured to:

compare the measured deflection of the IMU to a first threshold; and map the measured deflection of the IMU to the data sequence responsive to the measured deflection exceeding the first threshold.

7. The self-reconfigurable remote control of claim 6, wherein the processor is further configured to map the measured deflection of the IMU to the data sequence responsive to the measured deflection exceeding the first threshold but not exceeding a second threshold.

8. The self-reconfigurable remote control of claim 1, wherein the processor is configured to determine the device has capability for six degrees-of-freedom for command sequences; and wherein mapping the measured deflection of the MU to the data sequence comprises generating the data sequence comprising the IMU data output.

9. The self-reconfigurable remote control of claim 1, wherein the pairing sequence comprises receiving a device identifier from the device.

10. The self-reconfigurable remote control of claim 1, wherein the data sequence comprises a command for changing volume, scrolling through a menu, or selecting alternate modes.

11. The self-reconfigurable remote control of claim 1, wherein transmitting the data sequence to the device causes the device to change a viewing direction in a 360 degree video.

12. The self-reconfigurable remote control of claim 1, wherein the processor is further configured to:

determine the device does not have the capability for one or more degrees-of-freedom for command sequences; and wherein the processor is further configured to map the measured deflection to a digital command sequence; and wherein transmitting the data sequence to the device causes the device to change channels according to the digital command sequence.

13. The self-reconfigurable remote control of claim 1, wherein the processor is further configured to:

determine the device does not have the capability for one or more degrees-of-freedom for command sequences; and wherein the processor is further configured to map the measured deflection to a digital command sequence; and wherein transmitting the data sequence to the device causes the device to change volume according to the digital command sequence.

14. The self-reconfigurable remote control of claim 1, wherein the processor is further configured to:

measure an acceleration of the measured deflection; and wherein mapping the measured deflection of the IMU to the data sequence is further based on the measured acceleration.

15. The self-reconfigurable remote control of claim 14, wherein the data sequence comprises a command for powering the device on or off.

16. The self-reconfigurable remote control of claim 1, wherein the processor is further configured to:

determine the device has capability for between one and six degrees-of-freedom for command sequences, and determine that the measured deflection is in a supported degree-of-freedom; and wherein mapping the measured deflection of the IMU to the data sequence comprises generating the data sequence comprising a scaled IMU data output.

17. The self-reconfigurable remote control of claim 1, wherein the transceiver comprises a Bluetooth transceiver, and wherein the processor is further configured to transmit the data sequence to the device via the Bluetooth transceiver.

18. A method, comprising:

identifying, by a processor of a self-reconfigurable remote, a device type of a device in communication with the self-reconfigurable remote according to a pairing sequence;

determining, by the processor via a device capability lookup table (LUT) stored in a memory of the self-reconfigurable remote, an inertial measurement unit (IMU) degree-of-freedom capability of the device;

measuring, by the processor, a deflection of an IMU of the self-reconfigurable remote from a first orientation;

mapping, by the processor, the measured deflection of the IMU to a data sequence according to the determined IMU degree-of-freedom capability of the device; and transmitting, by the processor via a transceiver of the self-reconfigurable remote, the data sequence to the device.

19. The method claim 18, wherein the pairing sequence is unsuccessful, and wherein the method further comprises mapping, by the processor, the measured deflection to a digital command sequence.

20. The method of claim 19, wherein the transceiver comprises an infrared transceiver, and wherein the method further comprises transmitting, by the processor, the digital command sequence via the infrared transceiver to the device.

* * * * *